United States Patent [19]

Allaire et al.

[11] Patent Number: 5,303,861
[45] Date of Patent: Apr. 19, 1994

[54] SEPARATING SHEET GLASS

[75] Inventors: Roger A. Allaire; William F. Pardue, Jr., both of Big Flats, N.Y.

[73] Assignee: Corning Incorporated, Corning, N.Y.

[21] Appl. No.: 938,956

[22] Filed: Sep. 1, 1992

[51] Int. Cl.⁵ .......................... C03B 33/03; B26F 3/00
[52] U.S. Cl. ...................................... 225/2; 225/96.5; 225/97; 225/103
[58] Field of Search ..................... 225/2, 96.5, 97, 103

[56] References Cited

U.S. PATENT DOCUMENTS

| | | | |
|---|---|---|---|
| 2,005,487 | 6/1935 | Zemanek | 225/103 |
| 2,924,044 | 2/1960 | Basso, Jr. | 225/103 |
| 3,303,980 | 2/1967 | Offenbacher | 225/2 |
| 3,454,219 | 7/1969 | Curtz et al. | 225/2 X |
| 3,465,934 | 9/1969 | Ono et al. | 225/96.5 X |
| 3,543,979 | 12/1970 | Grove et al. | 225/2 |
| 3,592,370 | 7/1971 | Boardman | 225/2 |
| 3,790,362 | 2/1974 | Dahlberg et al. | 65/174 |
| 4,140,258 | 2/1979 | Gray | 225/2 |
| 4,489,870 | 12/1984 | Prange et al. | 225/2 |
| 4,595,132 | 6/1986 | Abel | 225/103 |

FOREIGN PATENT DOCUMENTS 1110764 4/1968 United Kingdom .

Primary Examiner—Richard K. Seidel
Assistant Examiner—Raymond D. Woods
Attorney, Agent, or Firm—Milton M. Peterson

[57] ABSTRACT

A method of, and apparatus for, separating a sheet of glass along a score line on the sheet. The method comprises flexing the glass at the score line along an axis of flexure on the support to pre-stress the glass to a level below the critical stress level, and initiating a break at one end of the score line. The apparatus comprises a support for the sheet, the support defining an axis of flexure for alignment with the score line, at least one movable pressure member spaced above and on one side of the score line, a press head to move the pressure member into contact with the sheet of glass to pre-stress the sheet at the score line, and a break initiator at one end of the score line.

13 Claims, 4 Drawing Sheets

SEPARATING SHEET GLASS

FIELD OF THE INVENTION

The field is a method of, and apparatus for, separating sheet glass along a score line (vent crack).

BACKGROUND OF THE INVENTION

It is customary to produce flat glass products in large sheets, or as a continuous sheet. Such large glass sheets are then trimmed and separated into smaller units of desired size for use.

In general, the separation procedure, while subject to many variations in detail, may be stated as (1) creating a controlled defect in a glass sheet (scoring) and (2) extending that defect to separate the glass (breaking). Scoring may be by any means that induces or creates a crack, or other controlled defect. The crack or defect may be extended to separate the glass by bending to stress the glass, by tapping on the surface opposite a score line, or by thermal separation.

Most applications, where large quantities of sheet glass are scored and broken, require only moderate dimensional and surface quality. Therefore, currently available separation processes usually result in small scratches in the sheet surface, form non-square edges and produce many small chips.

Recently, a strong need has developed for relatively large quantities of precision glass panels. Such glass panels are required to have square edges and to be relatively chip free. More particularly, precision panels are required for fabricating active matrix liquid crystal displays. For this product, any chip larger than five microns in height and 25 microns in length is currently unacceptable. These stringent requirements are expected to become even more stringent as the technology progresses.

None of the high speed processes for breaking scored sheet glass, now in commercial use, satisfy the criteria for high quality panels, that is, chip free and square edges. Hand breaking may be used, but is obviously time-consuming and expensive. Therefore, a high speed process, capable of separating sheet glass into precision panels meeting the indicated requirements, is desperately needed.

It is then a basic purpose of this invention to meet that need. More particularly, it is a purpose of the invention to provide a process for producing precision glass panels in a high speed automatic operation. A further purpose is to supply precision glass panels for fabricating flat glass display products.

SUMMARY OF THE INVENTION

One aspect of our invention is a method of separating a sheet of glass along a score line on the sheet which comprises supporting the sheet on a support member defining an axis of flexure to be aligned with the score line, positioning the glass sheet on the support member with the score line aligned with the axis of flexure, flexing the glass at the score line along the axis of flexure to prestress the glass to a level below the critical stress level, and initiating a break at one end of the score line.

Another aspect of our invention is an apparatus for separating a sheet of glass along a score line on the sheet, the apparatus comprising a support for the sheet, the support defining an axis of flexure to be aligned with the score line, at least one movable pressure member spaced above and at least to one side of the score line, means to move the pressure member into contact with the sheet of glass to prestress the sheet at the score line, and means for initiating a break at one end of the score line.

PRIOR ART

The following patents disclose methods of separating sheet glass:

U.S. Pat. No. 3,543,979 (Grove et al.) describes a method of cutting glass with a laser beam of a wavelength to which the glass is opaque. If the glass is not immediately fractured, stress may be applied, for example, by passing the glass over a slightly elevated breaking roll.

U.S. Pat. No. 3,790,362 (Dahlberg et al.) describes controlling the temperature profile in a process for non-contact thermal severing of glass. FIG. 7 in the patent shows applying a bending moment to a sheet of glass around a thermal score or heat path.

United Kingdom Patent No. 1,110,764 (Barradell-Smith) describes a method of snapping a sheet of glass having a score line extending along the sheet. The method is characterized by applying, to opposite faces of the sheet, uniformly curved bending members of complementary form. The members extend across the sheet. Each comprises a plurality of contacting elements to impose on the sheet a curvature which is sufficient to snap the sheet along any score line parallel to the axis of the curvature, but is insufficient to break any unscored area of the sheet.

DESCRIPTION OF THE INVENTION

The present invention is generally applicable to the separation of a glass sheet into smaller size units. It is particularly applicable to the production of precision panels. Such panels are required to have square edges, and to also be free of surface damage, or edge defects, such as chips, hackle and hooks. The invention is also applicable to trimming a glass sheet preparatory to separation into panels.

The invention was developed as part of an effort to automatically separate biaxially scored glass sheets into individual panels for liquid crystal display (LCD) structures. The target was to produce panels having precision panel quality in a high speed automatic process.

Accordingly, much of the ensuing description is oriented to such product. However, the more general application will be readily apparent from subsequent description of alternative embodiments.

A glass breaking study began by exploring how a crack extends through the glass for sheet separation. The breaking mechanisms of the glass were then studied to understand what parameters defined edge quality during a break. As a result of this investigation, the following parameters were identified as being fundamental. They still define preferred embodiments of our invention. However, experience has shown that some degree of deviation may be tolerated depending on the precision required in edge quality.

1. A continuous and uniform depth score line should be present.
2. Stress loads should be applied uniformly along the full length of the score line.
3. Stress loads should be applied symmetrically across the score line, and preferably should be a maximum along the line.
4. The break crack should start from one end of a score line and propagate toward the other end of the line.
5. The break crack propagation should be continuous and rapid.

The basic concept of our invention is prestressing a scored glass sheet prior to initiating a break. Putting this concept into practice involves these general steps: (1) establish a score line, also referred to as a vent crack, (2) prestress the glass along the entire score line, and (3) initiate a break at one end of the prestressed score line.

Figure 1:
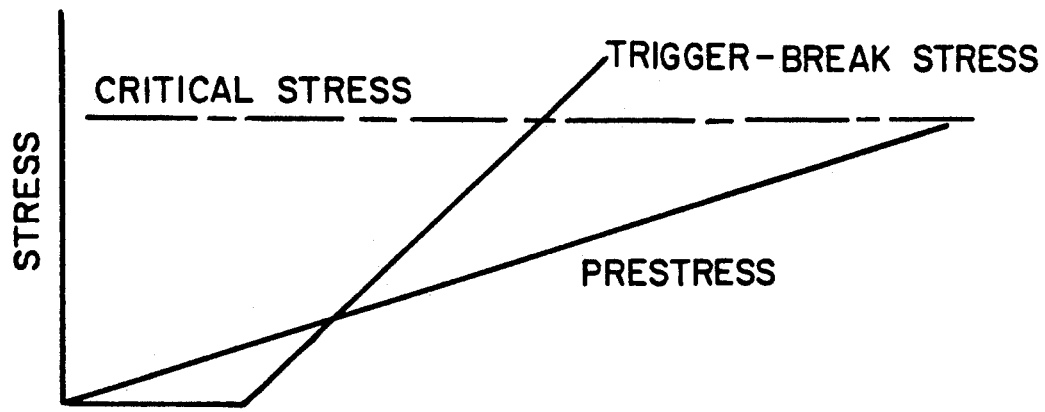
FIG. 1 is a graphical representation of the stress conditions applied to a glass sheet in carrying out the invention.

FIG. 1 is a generalized graphical representation of the considerations that must be imposed on a glass sheet to carry out this concept. The stress level in the glass is plotted on the vertical axis. The displacement of the pressure head creating stresses on the glass is plotted on the horizontal axis. Absolute values are purposely omitted in the interest of generalizing the showing.

In FIG. 1, a solid line, labeled "Prestress", shows the continuously increasing level of stress created along the full length of a score line as a pressure head is lowered against the glass. The prestress load is applied on at least one side of the score line to create stress in the score line by flexure. The level of prestress is designed to approach, but not to reach, the critical stress level before a break is initiated. The critical stress level is the level at which the glass freely separates along the score line. It is shown in FIG. 1 by a nonuniformly dashed line labeled "Critical Stress".

Once the score line is prestressed, a break or crack is initiated at one end of the score line. This initiates a break that runs continuously from the initiation point at one end of the score line to the opposite end of the line. Since this separation occurs in a prestressed environment, a chip-free, square edge is formed on each separated piece of glass.

Figure 2:
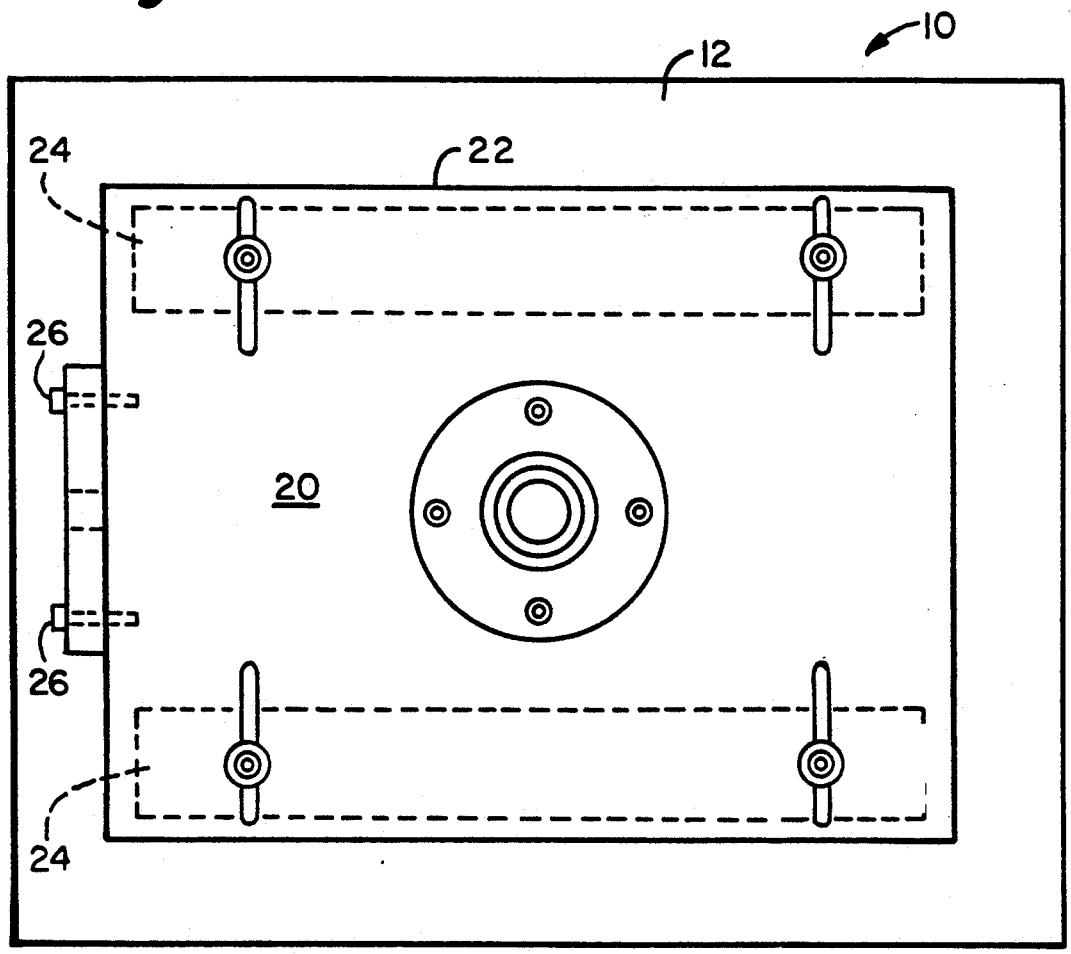
FIG. 2 is a top plan view of an apparatus in accordance with the invention.
Figure 3:
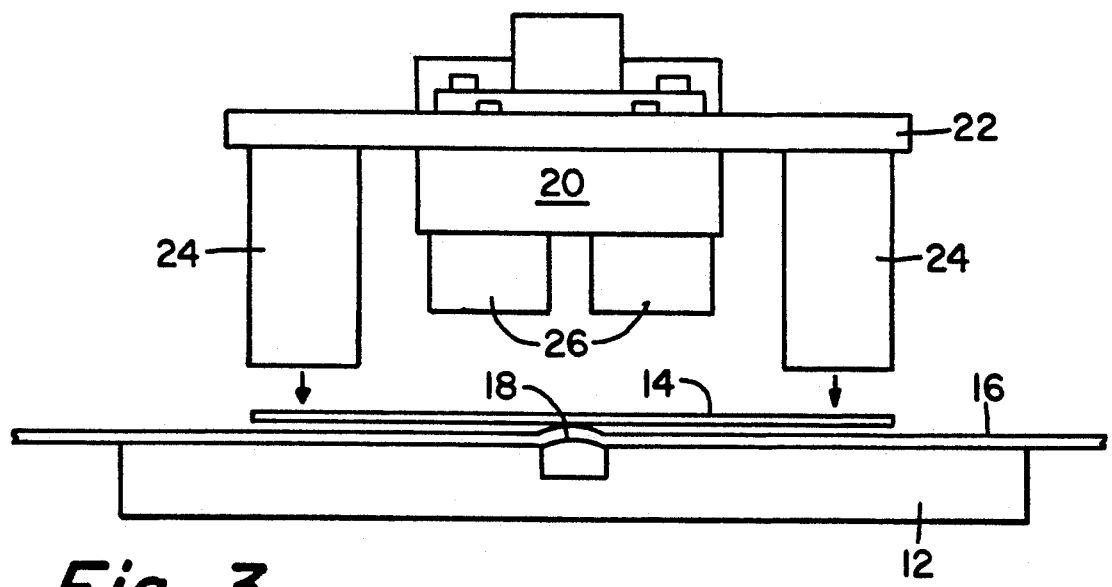
FIG. 3 is a front plan view of the apparatus of FIG. 2.

FIG. 2 is a top plan view of an apparatus developed to practice an aspect of the invention wherein a glass sheet is separated into two smaller units. The apparatus is generally designated by the numeral 10. FIG. 3 is a front plan view of apparatus 10.

Apparatus 10 embodies a base plate 12 which provides a flat surface against which a glass sheet 14 may be pressed. As shown, glass sheet 14 is conveyed over base plate 12 on a conveyor belt 16. A flexible belt is preferred to a hard surface for breaking. The contact at the break is very sensitive to surface irregularities which may cause deviations from a square edge on the glass. Such irregularities may result from chips or other particles on a hard surface.

Base plate 12 is provided with an elongated, raised, linear portion 18 in the nature of a hump. Raised portion 18 runs laterally the full width of conveyor belt 16 and glass sheet 14. As explained later, it functions as a fulcrum and defines an axis of flexure along which glass sheet 14 is flexed and prestressed. Fulcrum 18 is so positioned that a score line on glass sheet 14 may be positioned directly above and parallel to it. We prefer a fulcrum height of about 0.75 mm for use with 1.1 mm thick glass. However, heights of 0.1 to 1.5 mm have been used successfully. In general, greater fulcrum heights can be used with thinner glass.

Mounted above base plate 12, and adapted to vertical movement, is a pressure head for applying stress and clamping the sheet. The pressure head is generally designated 20. Pressure head 20 has a top plate 22 that carries prestress pads 24 and trigger break pads 26. Prestress pads 24 are coextensive in length with the width of base plate 12 and glass sheet 14. They are spaced apart on opposite sides of fulcrum 18. Break pads 26 are relatively short, and are positioned above one edge of glass sheet 14. They are also positioned on either side of fulcrum 18, but more closely spaced than pads 24.

Pads 24 and 26 may both be composed of neoprene foam rubber. However, pads 26 are formed from a relatively harder material than pads 24, whereby greater stress can be quickly generated. Taking fulcrum 18 and the glass score line as a reference center line, pads 24 are preferably spaced equidistant from the center line. A typical spacing between pads 24 is about 140 mm. As a general rule, prestress pads 24 can be narrower for use with thinner glass. We have used 50 mm thick pads with 1.1 mm glass.

Also, pads 24 extend downwardly somewhat more than pads 26, thereby reaching the glass surface sooner. In a typical arrangement, pads 24 are designed to reach the glass surface about 10 mm before pads 26. In addition to being shorter, pads 26 are also more closely spaced. Typically, they are about 15 mm to each side of the center line.

Figure 5:
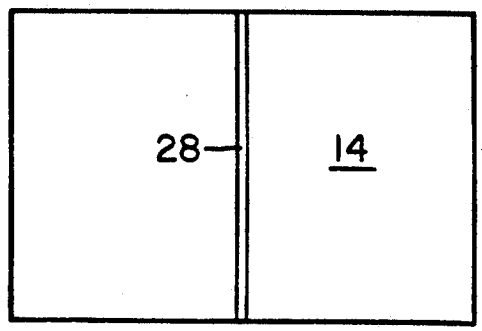
FIG. 5 is a top plan view of a scored glass sheet.

In operation, glass sheet 14 is scored along a line 28, as shown in FIG. 5. Glass sheet 14 is positioned on conveyor belt 16 with score line 28 aligned with the axis of flexure provided by fulcrum 18. Preferably, the alignment is as near exact as is feasible. However, slight offsets of up to one or two mm, either laterally or rotationally, may be tolerated on occasion.

Score line 28 may be produced in any known manner. We have employed a Villa score machine, Model GS100. Score line depths ranging from 80 to 130 microns have been used successfully, although score lines as shallow as five microns are acceptable. The critical requirement is that the score line be deeper than any surface defect. Shallow depths are preferred to permit higher prestress levels which appear to give better quality break surfaces.

With score line 28 aligned with fulcrum 18, the pressure head 20 is lowered. Initially, prestress pads 24 simultaneously contact the glass surface on opposite sides of score line 28. This clamps the glass sheet against conveyor belt 16. An increasing stress level is generated as pressure head 20 is lowered further and glass sheet 14 is bent about fulcrum 18.

Before the prestress level reaches the critical stress level, break pads 26 contact the glass. Contact is made at the edge of glass sheet 14 and on opposite sides of score line 28. This generates a stress in excess of the critical level as illustrated in FIG. 1. Thereby, a break is initiated that runs along score line 28 to the opposite side of glass sheet 14.

The break must be initiated at the end of score line 28. If a break is initiated along the score line as a result of bending by the prestress pads 24, the origin is not predictable, and backside hooks are encountered. However, the cleanest break is achieved when both prestress and break are generated in one rapid stroke of stress applicator 20. This assures minimum growth of the score line before a break is triggered by break pads 26.

The initiation of a break has been described as the action of break pads 26 at the end of score line 28, and that is a preferred embodiment. However, a break may be initiated by pressure from a single pad applied adjacent to, and on one side of, the end of score line 28, or even over the end of the score line. As described hereafter, means other than pressure pads 26 may be employed to initiate a break. The requirement is that the critical stress level must be reached at one end of score line 28 while the remainder of the score line is prestressed at a lesser stress level.

Figure 4:
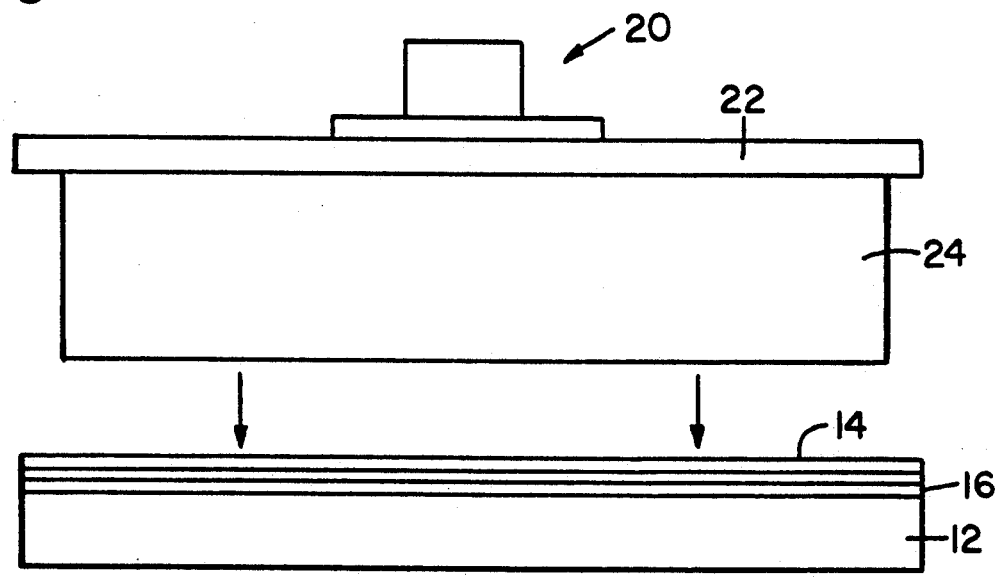
FIG. 4 is an end view of the apparatus of FIG. 2.

The invention may also be practiced with modified versions of the apparatus depicted in FIGS. 2, 3 and 4. In these versions, the second set of pressure pads, that is, pads 26, is eliminated. To this end, pressure pads 24 are so adjusted in position that they do not generate uniform stress across the sheet. Rather, they generate greater stress at one end of a score line than at the other end, thereby initiating the break at the high stress end.

Figure 6:
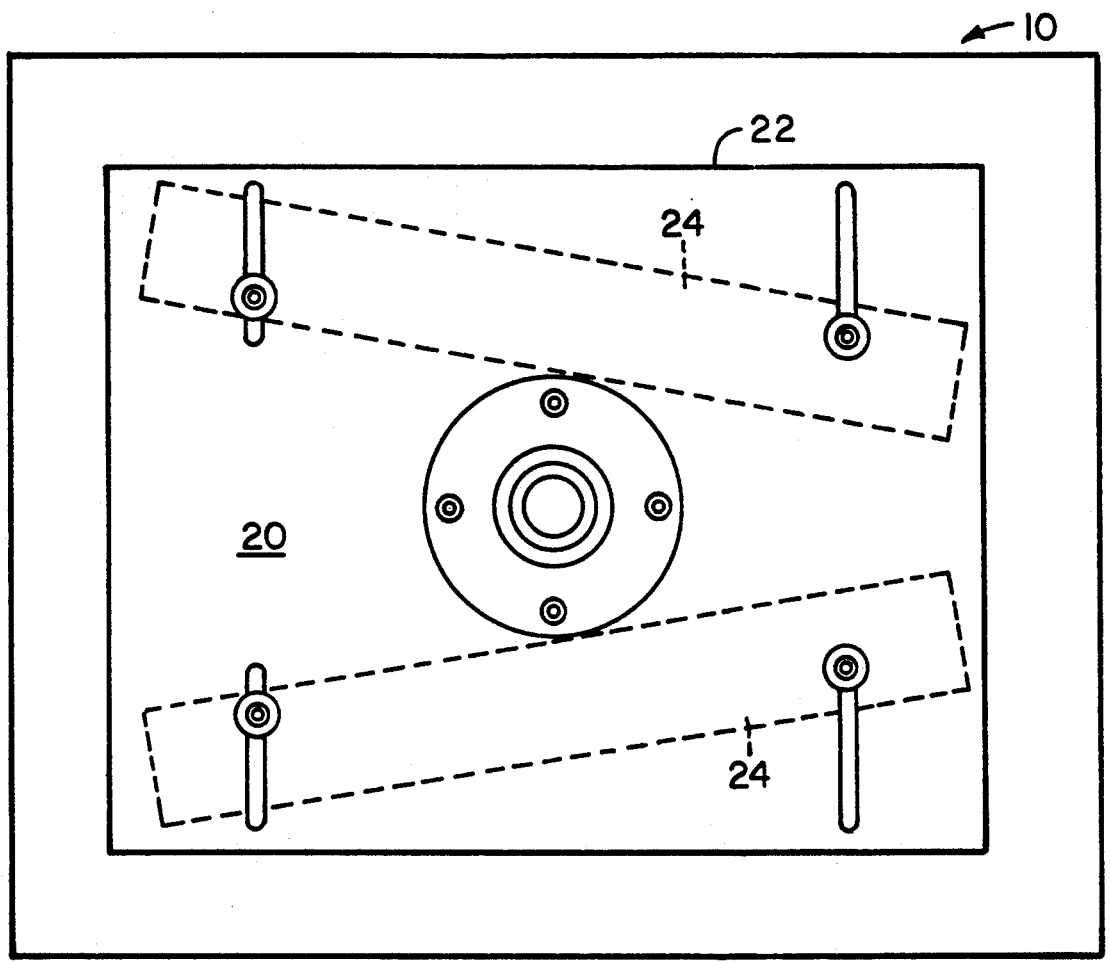
FIG. 6 is a top plan view of a modified version of the apparatus depicted in FIGS. 2, 3 and 4.

FIG. 6 is a top plan view of an apparatus illustrating one version. In this version, the apparatus shown in FIG. 2 is modified by shifting pads 24 away from positions parallel to the score line, but still on opposite sides thereof. Thus, pads 24 may be toed in toward the score line at one end, as shown. Thereby, they are more closely spaced adjacent to one end of the score line. Consequently, when pads 24 press against the glass sheet, greater stress is generated by the closely spaced ends. As a result, a break is initiated at that end of the score line when the critical stress level is reached.

Figure 7:
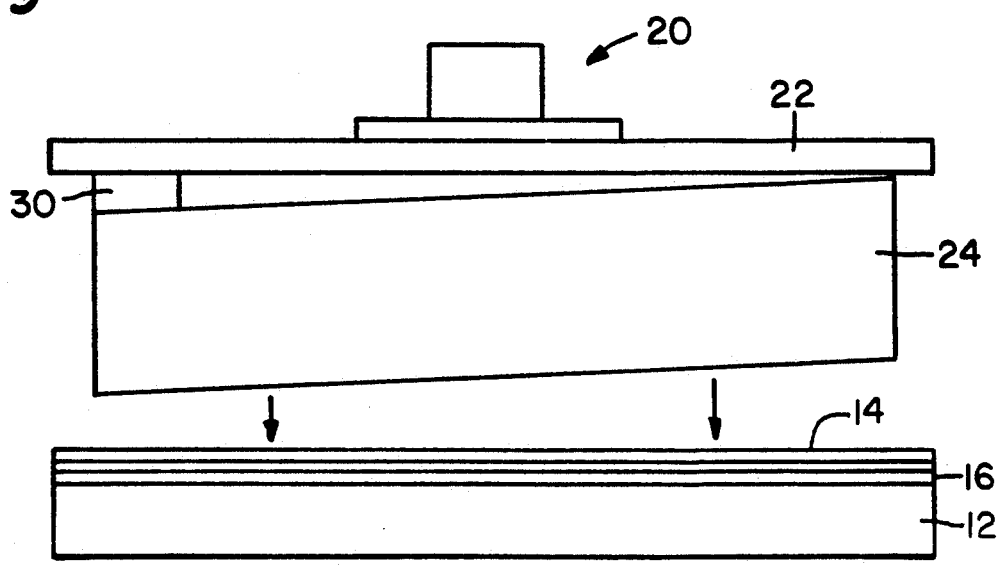
FIG. 7 is an end view illustrating a further modification of the apparatus of FIGS. 2, 3 and 4.

FIG. 7 is an end view of an apparatus illustrating another version. In this version, the apparatus shown in FIG. 4 is modified by positioning pads 24 lower at one end than at the opposite end. This may be accomplished by depressing pads 24 at one end, for example, by inserting a wedge or shim 30, as shown in FIG. 7. Alternatively, it may be accomplished in similar manner by tilting, or elevating upward, the opposite ends of the pads. In either arrangement, the lower ends of the pads make initial contact with the glass sheet adjacent one end of the score line. This generates greater stress at that end with a break being initiated when the critical stress level is reached.

The invention has been practiced through a wide range of equipment variations and glass score conditions. These include:
1. fulcrum height of 0.1 to 1.5 mm with 0.75 mm preferred.
2. prestress pads spaced 20 mm to 110 mm from the score line with 70 mm preferred.
3. score line depth of 5 to 130 microns with about 80 microns preferred.
4. foam rubber materials having low to high modulus.
5. both a metal plate and a flexible belt as support for the glass sheet with the latter preferred.

Figure 8:
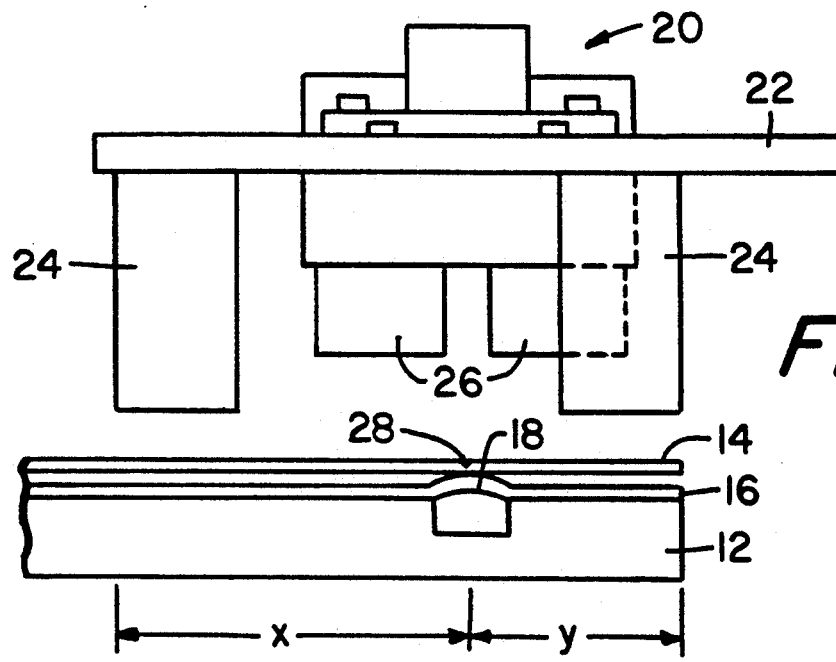
FIG. 8 is a side view of an apparatus in accordance with the invention for separating an edge portion of a glass sheet.

The invention has been described with reference to the severing of a glass sheet into smaller units. It should be appreciated that the invention may be applied to another important severing operation as well. This is edge separating. Such an operation is now described utilizing a modification of the apparatus described above. The modified apparatus is shown in FIG. 8, a side view similar to that of FIG. 3. The essential difference is that pressure pads 24 are spaced asymmetrically with respect to fulcrum 18 and score line 28. This is indicated by a dotted line composed of segments x and y which meet at a point in line with score line 28.

In an edge separating operation, a glass sheet is scored a short distance in from the edge along a line parallel with the edge. Pressure head 20 is set to generate stress on opposite sides of the score line as before to prestress the glass sheet. Prestress pads 24 contact the sheet on opposite sides of the score line 28, but are spaced asymmetrically therefrom. The pad contacting the strip to be separated from the sheet is set to contact closer to the score line than the pad that contacts the main part of the sheet. This is indicated by the dotted line composed of segments x and y. For example, x might be 20 mm when y is 70 mm.

Figure 9:
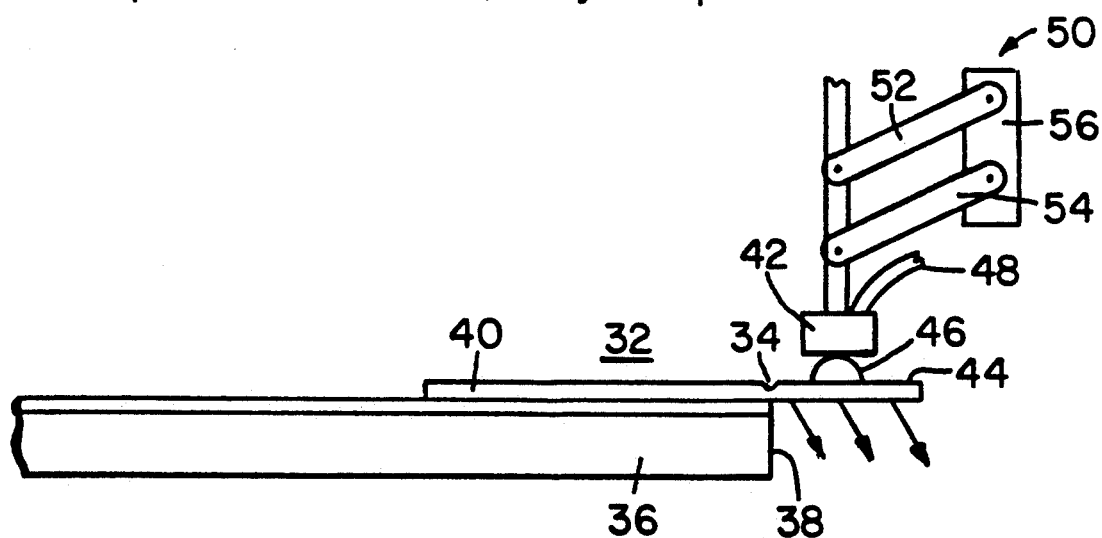
FIG. 9 is an end view, partly schematic, showing an alternative form of apparatus in accordance with the invention.

FIG. 9 depicts a modified arrangement that is particularly adapted to edge separation. In this arrangement, a glass sheet 32 has a score line 34 parallel with, and inset from, one edge of the sheet. Glass sheet 32 is positioned on table 36 with score line 34 aligned with, or just off ($<6$ mm), an edge 38 of the table. Edge 38 then defines an axis of flexure as hereafter described.

The main body 40 of glass sheet 32 is firmly held in place on table 36 in any known manner, for example by clamps (not shown). A pressure bar 42 is positioned on, or just above, the portion 44 to be removed from glass sheet 32. Pressure bar 42 is provided with means, shown at 50, for imparting a predetermined motion cycle. Bar 42 is also provided with suction cups 46 having attached vacuum lines 48. Suction cups 46 are spaced along the length of bar 42 as desired. In a typical operation, four cups are equally spaced along an 800 mm long bar.

In operation, pressure bar 42 is lowered to bring suction cups 46 into contact with trim portion 44. As pressure is applied to the glass surface, the glass is prestressed along score line 34. This flexes glass sheet 32 along the axis of flexure defined by edge 38 of table 36. Prior to reaching the critical stress level along score line 34, a break is initiated at one end of the score line. One convenient means of initiating the break is to increase the pressure applied by the first suction cup on bar 42. This may be accomplished, for example, by having that cup extend further down. Thereby, it contacts the sheet before the remaining cups contact the sheet. Alternatively, the first, or outer, cup may be composed of a firmer, or less elastic, material so that it generates greater stress as pressure is applied by bar 42.

With the separation of the trim portion 44 from the main body 40 of glass sheet 32, pressure bar 42 is actuated along a predetermined path. This pulls the trim portion 44 simultaneously down and away from main body 40. This avoids contact between the freshly created glass edges. Such contact could generate chips or other flaws deleterious to a square edge on the main body 40 of the glass sheet. The predetermined path of bar 42 and trim portion 44 may be generally outwardly and downwardly, with respect to main body 40 and table 36 on which the glass rests. This is shown schematically by arrows in FIG. 9. At the end of the predetermined path, vacuum may be released on the suction cups 46 to thereby release the trim portion 44 for disposal.

The means 50 for imparting the predetermined motion just described is preferably a 4-bar linkage 50 as shown in FIG. 9. Linkage 50 is constituted by parallel bars 52 and 54, stationary bar 56 and movable bar 42. Parallel bars 52 and 54 are connected to bar 56 at one end of each bar. The opposite ends are connected to movable bar 42. As bar 42 is moved downward, bars 52 and 54, which remain parallel, tend to pull it outward. Thus, bar 42 carries trim portion 44 down and away from the edge of main body 40 simultaneously with the break.

We claim:

1. A method of separating a sheet of glass along a score line on the sheet, comprising:
   supporting the sheet on a support member defining an axis of flexure to be aligned with score line, positioning the glass sheet on the support member with the score line aligned with the axis of flexure, flexing the glass sheet at the score line along the axis of flexure to prestress the glass to a level approaching, but below its critical stress level, and initiating a break at one end of the score line,
   wherein the support member is a flat surface against which said glass sheet is held while a length of glass to be separated from the glass sheet extends beyond an edge of the flat surface, the score line is aligned with the edge of the support member, and pressure is applied to the length of glass to be separated, the glass thereby being prestressed,
   and wherein the length of glass to be separated has said pressure applied through suction cups carried on a support member, said pressure being applied at spaced intervals along the length of glass to be separated.

2. A method in accordance with claim 1 wherein greater pressure is applied at one end of the length of glass to be separated, thereby initiating the break at the end of the score line that corresponds to the end of the length of glass to which the greater pressure is applied.

3. A method in accordance with claim 1 wherein the support member for the suction cups is moved simultaneously down and away from the glass sheet as the break occurs, thereby carrying away the length of glass.

4. A method in accordance with claim 3, wherein the length of glass is carried away by a 4-bar linkage.

5. A method in accordance with claim 1 wherein the score line has a depth of 5-130 microns.

6. An apparatus for separating a sheet of glass along a score line on the sheet, the apparatus comprising:
   a support for the sheet, the support defining an axis of flexure to be aligned with the score line, at least one movable pressure member spaced above and at least to one side of the score line, means to move the pressure member into contact with the sheet of glass to prestress the sheet at the score line, and means for initiating a break at one end of the score line,
   wherein there are two movable pressure members positioned above and on opposite sides of the score line and being a first set of pressure pads,
   wherein the break initiating means is a second set of pressure pads so positioned and spaced as to be moved into contact with the glass sheet on opposite sides of the score line.

7. An apparatus in accordance with claim 6 wherein the axis of flexure is an elevated portion on the support for the sheet.

8. An apparatus in accordance with claim 6 wherein the second set of pressure pads is spaced closer together than the first set.

9. An apparatus in accordance with claim 6 wherein the first set of pressure pads is evenly spaced from the score line.

10. An apparatus in accordance with claim 6 wherein the first set of pressure pads is unevenly spaced from the score line.

11. An apparatus for separating a sheet of glass along a score line on the sheet, the apparatus comprising:
    a support for the sheet, the support defining an axis of flexure to be aligned with the score line, a single movable pressure member spaced above and to one side of the score line, the movable pressure member comprising suction cups which contact the glass sheet, means to move the pressure member into contact with the sheet of glass to prestress the sheet at the score line, and means for initiating a break at one end of the score line.

12. An apparatus in accordance with claim 11 further comprising means for moving the pressure member simultaneously downwardly and outwardly from the glass sheet.

13. An apparatus in accordance with claim 12 wherein the pressure member is part of a 4-bar linkage.

* * * * *